United States Patent
Uematsu

(10) Patent No.: US 7,330,359 B2
(45) Date of Patent: Feb. 12, 2008

(54) POWER SUPPLY UNIT

(75) Inventor: Takeshi Uematsu, Tokyo (JP)

(73) Assignee: TDK Corporation, Tokyo (JP)

( * ) Notice: Subject to any disclaimer, the term of this patent is extended or adjusted under 35 U.S.C. 154(b) by 364 days.

(21) Appl. No.: 11/055,778

(22) Filed: Feb. 11, 2005

(65) Prior Publication Data
US 2005/0180180 A1    Aug. 18, 2005

(30) Foreign Application Priority Data
Feb. 12, 2004    (JP) ............................. 2004-035110

(51) Int. Cl.
*H02M 3/335*    (2006.01)
(52) U.S. Cl. ................ 363/21.12; 363/21.02; 363/21.04; 363/21; 363/21.18
(58) Field of Classification Search ............ 363/21.02, 363/21.04, 21
See application file for complete search history.

(56) References Cited
U.S. PATENT DOCUMENTS

| | | | | |
|---|---|---|---|---|
| 5,610,804 A | * | 3/1997 | Shimizu | .................. 363/21.16 |
| 6,295,214 B1 | * | 9/2001 | Matsumoto et al. | ..... 363/21.01 |
| 6,385,061 B1 | * | 5/2002 | Turchi et al. | ............ 363/21.15 |
| 6,429,629 B1 | * | 8/2002 | Nguyen | ....................... 323/255 |
| 6,842,350 B2 | * | 1/2005 | Yamada et al. | .......... 363/21.16 |
| 7,002,323 B2 | * | 2/2006 | Natori | ........................ 323/225 |
| 7,035,119 B2 | * | 4/2006 | Koike | ......................... 363/19 |
| 2004/0252533 A1 | * | 12/2004 | Eguchi | ........................ 363/97 |

FOREIGN PATENT DOCUMENTS

| | | |
|---|---|---|
| JP | 4-175908 | 6/1992 |
| JP | 8-70573 | 3/1996 |
| JP | 2002-374672 | 12/2002 |

* cited by examiner

*Primary Examiner*—Patrick Assouad
*Assistant Examiner*—Emily P Pham
(74) *Attorney, Agent, or Firm*—Oblon, Spivak, McClelland, Maier & Neustadt, P.C.

(57) ABSTRACT

The present invention is directed to a power supply unit that provides large power supply to the load. The voltage detector 51 generates a voltage detection signal by detecting the voltage generated at the output terminals 21, 22. The current detector 52 generates a current detection signal by detecting the current that runs through the transformer 3. The control circuit 9 uses the voltage detection signal and the current detection signal and thereby controls, in at least one of the first and second switching elements SW1, SW2, the timing with which the switching element is turned ON and the length of time that the switching element remains ON, such that the transformer current flows in a continuous mode.

8 Claims, 14 Drawing Sheets

POWER SUPPLY UNIT

TECHNICAL FIELD

The present invention relates to a power supply unit. The power supply unit according to the present invention is used as a power supply input circuit to be connected to the front stage of a switching power supply or used as a switching power supply.

BACKGROUND OF THE INVENTION

Power supply units of this type in the known art are represented by the boost type and the buck-boost type. A typical boost type power supply unit is provided with a basic circuit structure that includes a rectifying circuit and a smoothing capacitor with a choke coil connected between them. A switching element is connected between power lines that are on a rear stage of the choke coil and a diode is connected in series with a power supply line that is on a rear stage of the switching element. Furthermore, an output capacitor is connected between the power lines on the rear stage of the diode and both ends of the output capacitor are led to an output terminal. In this circuit structure, the output capacitor is charged in one direction with the energy supplied by the power source and the energy stored in the choke coil while the switching element is ON via the diode to generate boosted voltages at both ends of the output capacitor.

A typical example of the buck-boost type power supply unit is a flyback converter system in which a switching element is connected in series with the input winding of the transformer for conversion and the energy stored in the transformer for conversion while the switching element is ON is transferred to the load side during the subsequent OFF period. However, the power supply units in the known art described above present the following problems.

First, in a boost type power supply unit, there is only a switching element connected between the power lines and there is no switching element to be connected in series to the power lines. Because of this, when the switching element has stopped its switching operation and is in an OFF state, the input voltage is output through the lines without regulation. Furthermore, if the output terminals are shorted or overloaded, protection against over current cannot be implemented. In addition, when the input voltage is applied, a rush current runs to the smoothing capacitor, and it may cause electrical damage to the rectifying circuit.

Another problem is that, since the output voltage is always higher than the input voltage, a DC-DC converter with high allowable input voltage is required on the rear stage. As for a buck-boost type power supply unit, since it is provided with a transformer for conversion which isolates the input terminals from the output terminals, unlike a boost type power supply unit, it does not present problems caused by the absence of a switching element connected in series to the power supply line. However, in this case, the entire energy must be transferred via the transformer for conversion. This, in turn, leads to lowered efficiency in energy conversion and a larger circuit.

In order to solve these problems, for example, JP H8-70, 573A (Prior Art 1) discloses a power supply unit having a first energy transfer circuit and a second energy transfer circuit. The first energy transfer circuit, which includes a transformer and a first switching element, provides a configuration similar to the buck-boost type power supply unit and the second energy transfer circuit, which includes a second switching element and the output winding of said transformer, provides a configuration similar to the boost type power supply unit, thereby solving the above-mentioned respective problems of the boost type power supply unit and the buck-boost type power supply unit.

However, since the power supply unit of Prior Art 1 has a control system based upon only the output voltage value, there is a period in which the current through the transformer is zero. Consequently, in large power supply (200 W or larger, for example) to the load, the transformer current runs only in a period in which the transformer current is not zero. As a result, the peak value of the transformer current rises up.

Thus, in large power supply to the load, the power supply unit of Prior Art 1 requires a large-sized transformer for large current flowing or a large-capacity switching element for large current switching. Which poses problems such as cost increase and size increase in power supply units.

SUMMARY OF THE INVENTION

An object of the present invention is to provide a power supply unit which provides large power supply to the load.

A further object of the present invention is to provide a power supply unit in which cost reduction is achieved.

A still further object of the present invention is to provide a power supply unit in which miniaturization is achieved.

In order to achieve the objects described above, the power supply unit according to the present invention comprises input terminals, output terminals, a first energy transfer circuit, a second energy transfer circuit, a voltage detector, a current detector and a control circuit. The input terminals are the terminals to which a DC voltage is input.

The first energy transfer circuit includes a transformer, a first switching element, a second diode and a capacitor. The first switching element is connected in series to an input winding of the transformer. The second diode is connected in series with an output winding of the transformer while having directionality that runs in the forward direction relative to the voltage generated at the output winding when the first switching element is OFF and the circuit thus connected in series is connected to the output terminals. The capacitor is connected between the output terminals.

The first energy transfer circuit constitutes a circuit for transferring the energy that is stored in the transformer while the first switching element is ON, to the output terminals via the output winding of the transformer during a subsequent OFF period.

The second energy transfer circuit includes a second switching element, the output winding of the transformer and a first diode. The second switching element, the output winding and the first diode are connected within a circuit loop that runs from one of the input terminals to one of the output terminals and then runs to a load and the other of the output terminals before returning to the other of the input terminals. One end of the first diode is connected with one end of the second diode while having the same polarity.

The second energy transfer circuit constitutes a circuit for transferring energy from the input terminals to the output terminals via the output winding while the second switching element is ON.

The voltage detector generates a voltage detection signal by detecting the voltage that appears at the output terminals. The current detector generates a current detection signal by detecting the current that runs through the transformer. The control circuit uses the voltage detection signal and the current detection signal and thereby controls, in at least one of the first and second switching elements, the timing with which the switching element is turned ON and the length of time that the switching element remains ON, such that the transformer current flows in a continuous mode.

As described above, the power supply unit of the present invention includes a first energy transfer circuit. The first energy transfer circuit includes a transformer and a first switching element, and the first switching element is connected in series with an input winding of the transformer.

Thus, the first energy transfer circuit can transfer the energy stored in the transformer while the first switching element is ON to the output terminals via the output winding of the transformer during the subsequent OFF period, in a similar manner to a buck-boost type power supply unit of a flyback system or the like.

Therefore, since the power supply unit of the present invention can achieve an operation similar to a buck-boost type power supply unit of a flyback system or the like, a situation in which the input voltage is output through the lines without regulation does not occur when the first switching element has stopped its switching operation and is in an OFF state. Furthermore, if the output terminals are short-circuited or overloaded, protection against overcurrent can be realized. And since power is transferred through a transformer, there is not the possibility that a rush current runs to the smoothing capacitor provided at the output terminals. In addition, since an output voltage value can be optionally set, it is not necessary to provide a DC-DC converter having a high allowable input voltage at a rear stage.

The power supply unit of the present invention includes a second energy transfer circuit. The second energy transfer circuit includes a second switching element and the output winding of the transformer. The second switching element and the output winding are connected within a circuit loop that runs from one of the input terminals to one of the output terminals and then runs to a load and the other of the output terminals before returning to the other of the input terminals.

Thus, the second energy transfer circuit can constitute a circuit for transferring energy from the input terminals to the output terminals via the output winding while the second switching element is ON. That is to say, the second energy transfer circuit can transfer the energy supplied from the power supply to the output terminals and the energy stored in the transformer while the first switching element is ON, to the output terminals while the second switching element is ON.

Accordingly, in the power supply unit of the present invention, in case of transferring energy from the input terminals to the output terminals by means of the second energy transfer circuit, since it is not necessary to transfer the energy through an electromagnetic coupling between the input winding and the output winding of a transformer, a load on the transformer is reduced and the efficiency of conversion is increased. And since the output winding of the transformer is used also as a choke coil, a dedicated choke coil is not necessary and reduction in number of components, miniaturization and reduction in cost can be achieved.

Moreover, in the power supply unit of the present invention, a first switching element included in a first energy transfer circuit and a second switching element included in a second energy transfer circuit are connected in parallel with each other being seen from the input terminal side. Consequently, even if the first switching element and the second switching element are turned ON at the same time, the electric current at the time of transferring energy is split and the power loss by the switching elements can be reduced.

In addition, the power supply unit of the present invention includes a voltage detector and a control circuit. The voltage detector generates a voltage detection signal by detecting the voltage that appears at the output terminals. The control circuit uses the voltage detection signal and thereby controls, in at least one of the first and second switching elements, the length of time that the switching element remains ON and the timing with which the switching element is turned ON.

Thus, the power supply unit of the present invention can perform such controls as keeping an output voltage constant, continuously transferring energy from the input side to the output side, improving the power factor.

Furthermore, the power supply unit of the present invention includes a current detector. The current detector generates a current detection signal by detecting the current that runs through the transformer. The control circuit uses the voltage detection signal in addition to the voltage detection signal, and thereby controls, in at least one of the first and second switching elements, the length of time that the switching element remains ON and the timing with which the switching element is turned ON. Thus, the current running through the transformer is controlled to flow in a continuous mode. "A continuous mode" refers to a mode in which there is substantially no period of the current value being zero in the current waveform.

Since the transformer current is controlled to flow in a continuous mode, there is no possibility in that the transformer current might run at large value in a period in which the transformer current is not zero. The peak value of the transformer current does not rise.

Accordingly, large power supply (200 W or larger, for example) to the load is achieved without employing a large-sized transformer for large current flowing or a large-capacity switching element for large current switching.

And since it is unnecessary to employ a large-sized transformer for large current flowing or a large-capacity switching element for large current switching, problems such as cost increase and size increase in power supply units are prevented.

A continuous mode control is described in detail with reference to simulation data in "DESCRIPTION OF THE PREFERRED EMBODIMENTS" described later.

BRIEF DESCRIPTION OF THE DRAWINGS

These and other advantages, features and objects of the present invention will be understood by those of ordinary skill in the art referring to the annexed drawings, given purely by way of non-limitative example.

DESCRIPTION OF THE PREFERRED EMBODIMENTS

Figure 1:
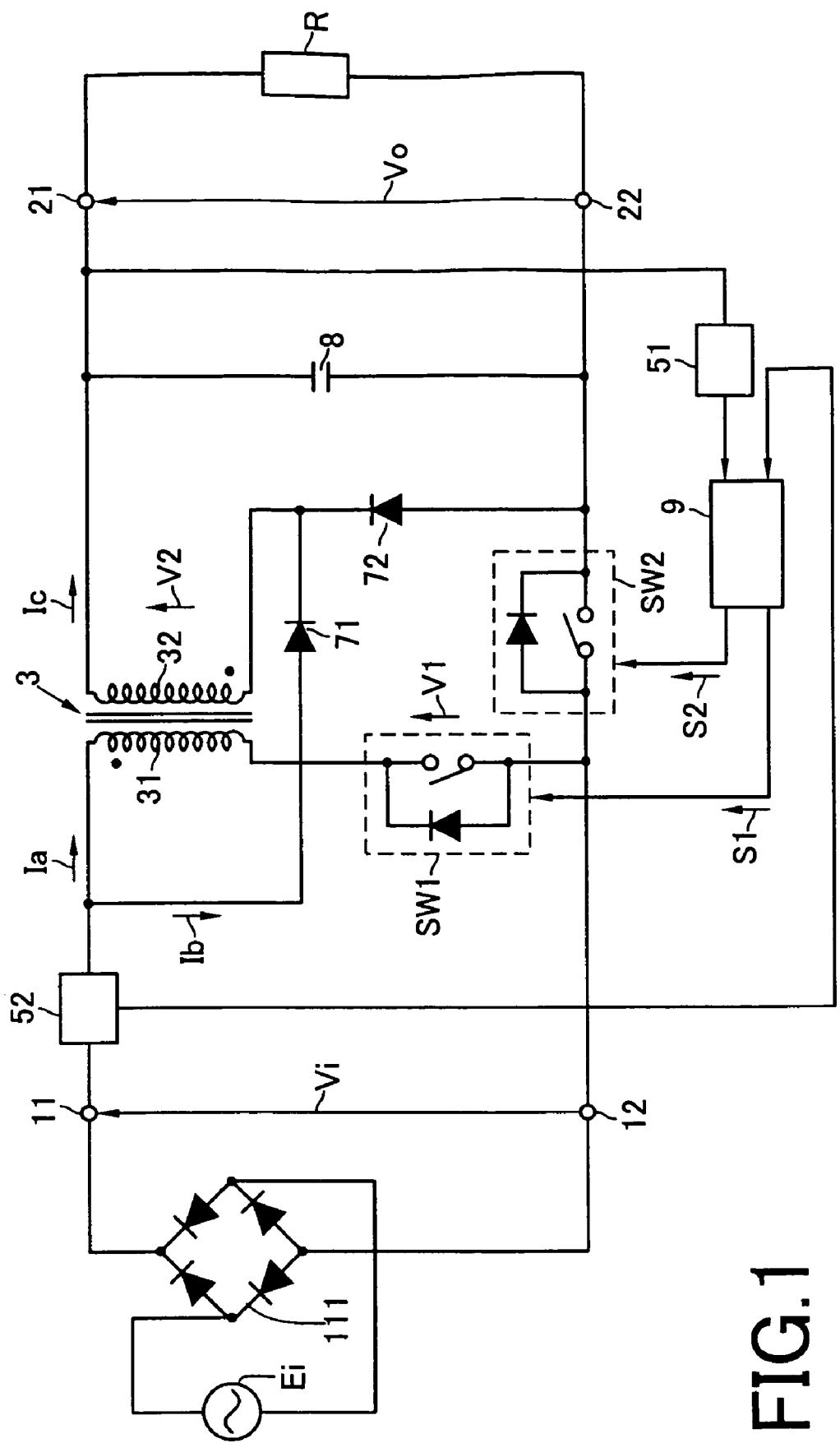
FIG. 1 is an electric circuit diagram showing an embodiment of a power supply unit according to the present invention.
Figure 2:
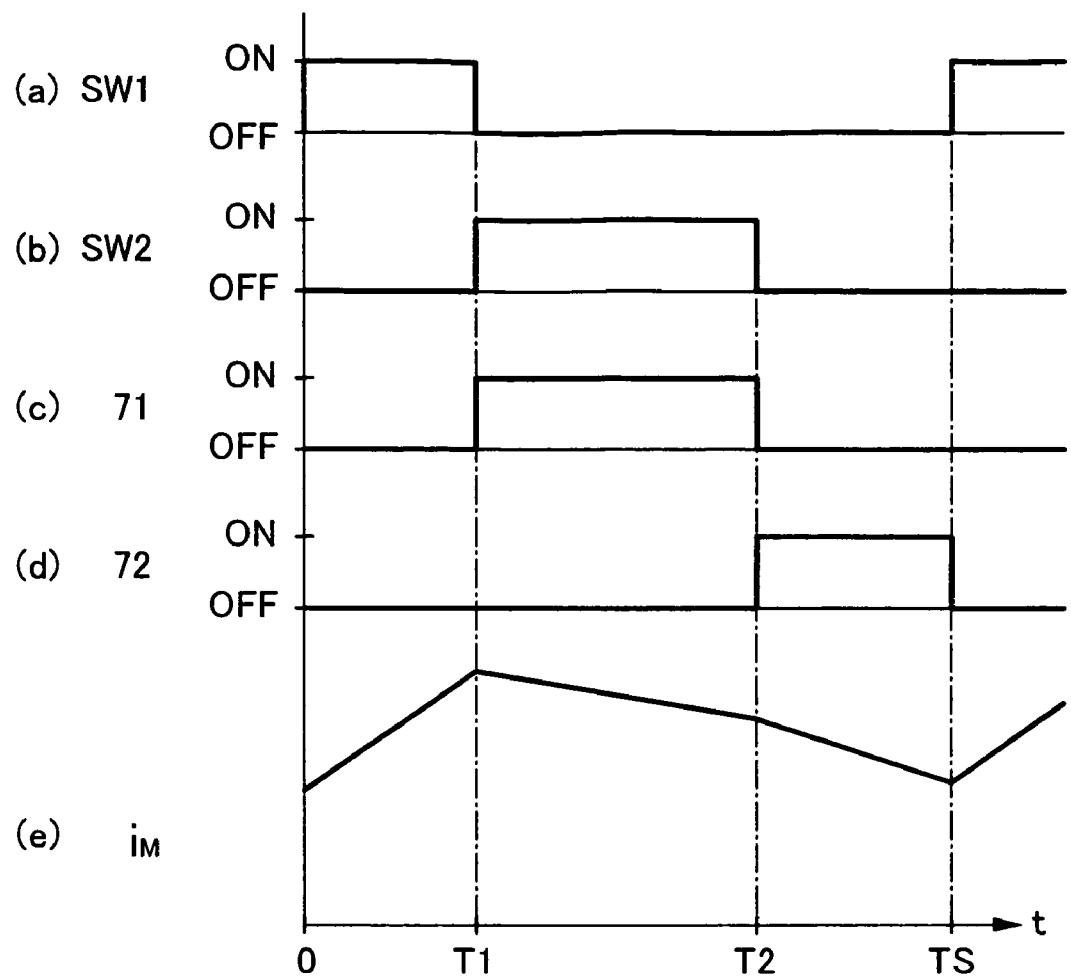
FIG. 2 is a timing chart for explaining operation of the power supply unit shown in FIG. 1.

FIG. 1 is an electric circuit diagram showing an embodiment of a power supply unit according to the present invention and FIG. 2 is a timing chart for explaining operation of the power supply unit shown in FIG. 1.

In FIG. 1, a power supply unit according to the present invention comprises a first energy transfer circuit, a second energy transfer circuit, input terminals 11 and 12, output terminals 21 and 22, a voltage detector 51, a current detector 52 and a control circuit 9. The control circuit 9 is composed of, for example, two general-purpose PFC (Power Factor Controller or Power Factor Correction) control ICs, and the two general-purpose PFC control ICs are synchronous with each other. And the control circuit 9 may be a circuit composed of a single general-purpose PFC control IC and a counter circuit.

An alternating current power supply Ei is connected with the input terminals 11 and 12 through a diode bridge circuit 111. Due to this, a DC voltage obtained by full-wave rectifying an AC voltage results in being inputted to the input terminals 11 and 12. A load R is connected to the output terminals 21 and 22. In the present invention, it is possible to consider a load of about 200 W as a normal load and a load of about 500 W as a heavy load.

The first energy transfer circuit comprises a transformer 3, a first switching element SW1, a second diode 72 and a capacitor 8. The transformer 3 has an input winding 31 and an output winding 32. A black circular dot represents the beginning of winding.

The first switching element SW1 is composed of a three-terminal element such as an FET, a bipolar transistor, a thyristor, a triac, an IGBT or the like, or another semiconductor element with a control electrode, and its main electrode circuit is connected in series with the input winding 31 and the circuit connected in series is connected with the input terminals 11 and 12 and switches the current flowing through the serial circuit.

The second diode 72 is connected in series with the output winding 32, and the circuit connected in series is connected with the output terminals 21 and 22. The polarity of the second diode 72 is directed so as to be in the forward direction relative to a voltage (flyback voltage) V2 generated at the output winding 32 when the first switching element SW1 is turned OFF.

The second energy transfer circuit comprises a first diode 71, the output winding 32 of the transformer 3, a second switching element SW2 and a capacitor 8. The first diode 71 has one terminal connected with one terminal of the second diode 72 so that these terminals have the same polarity as each other, and has the other terminal connected with the input terminal 11 side.

The second switching element SW2 is a three-terminal element such as an FET and the like for example, and is connected between the input terminal 12 and the output terminal 22. The main electrode circuit of the second switching element SW2 forms a serial circuit together with the output winding 32, the first diode 71 and the capacitor 8 being seen from the input terminal 11, 12 side. The capacitor 8 is connected in parallel with the output terminals 21 and 22.

And the second diode 72, the capacitor 8 and the output winding 32 form an energy releasing circuit, which releases the energy stored in the transformer 3 through the energy transfer process of the first and second energy transfer circuits.

The voltage detector 51 is connected, for example, between the output terminals 21 and 22, and detects the output voltage Vo. The current detector 52 is connected, for example, to the input terminal 11, and detects the current running through the input terminal 11. The current detector 52 may be connected to the input terminal 12.

In an illustrated power supply unit having such a configuration, the control circuit 9 controls, in at least one of the first and second switching elements SW1 and SW2, the length of time that the switching element remains ON and the timing with which the switching element is turned ON. The control circuit 9 preferably controls the length of time that at least the first switching element SW1 remains ON and the timing with which the first switching element SW1 is turned ON.

Concretely, for example, the control circuit 9 can perform control so as to feed a first control signal S1 to the first switching element SW1 and thereby turn off the first control signal S1 and thereafter feed a second control signal S2 to the second switching element SW2 and thereby turn on the second switching element SW2.

Figure 3:
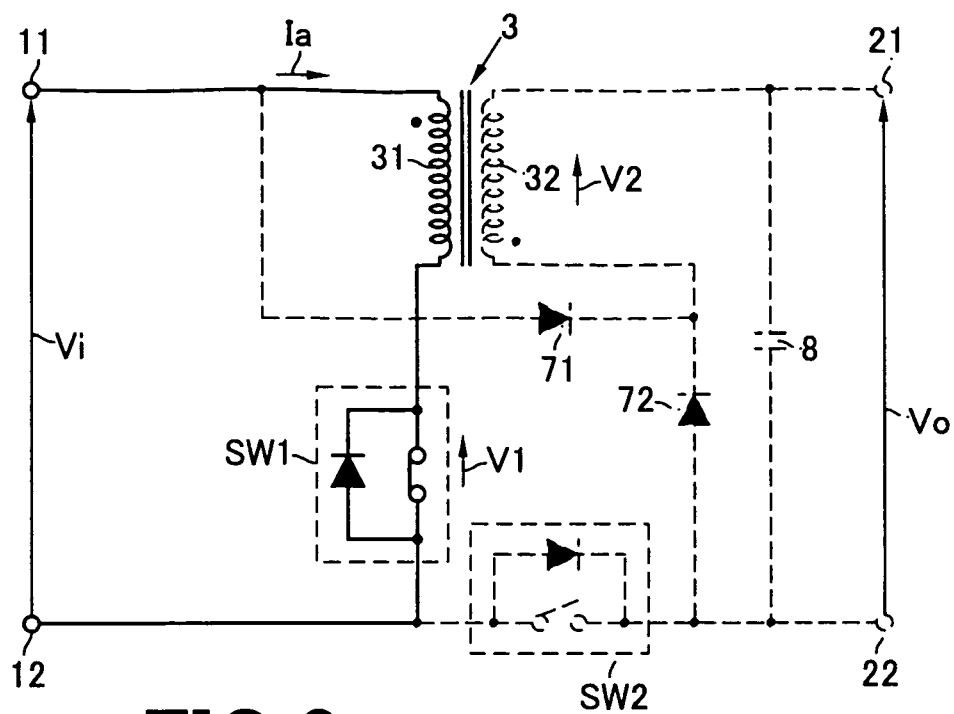
FIG. 3 is a circuit diagram showing an operation corresponding to the timing chart shown in FIG. 2.
Figure 4:
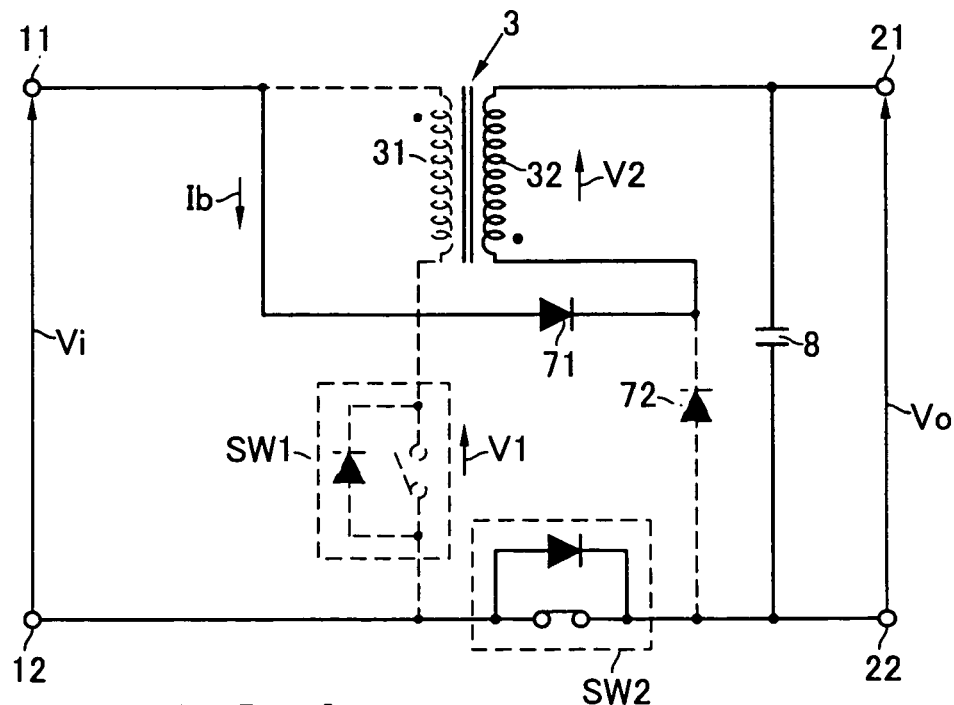
FIG. 4 is another circuit diagram showing an operation corresponding to the timing chart shown in FIG. 2.
Figure 5:
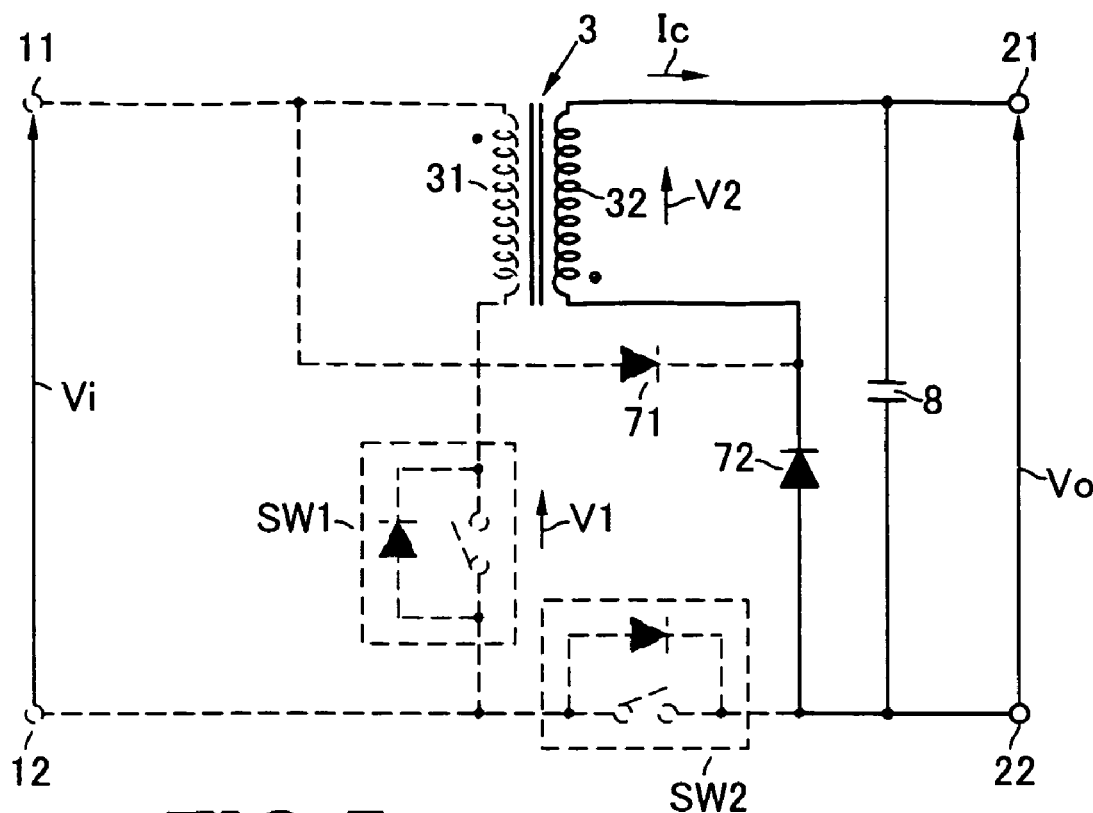
FIG. 5 is still another circuit diagram showing an operation corresponding to the timing chart shown in FIG. 2.

Next, an embodiment of a concrete operation of a power supply unit according to the present invention is described. FIGS. 3 to 5 are circuit diagrams showing operations corresponding to the timing chart shown in FIG. 2. In FIGS. 3 to 5, reference symbol V1 represents a terminal voltage of the first switching element SW1, reference symbol V2 represents a voltage generated at the output winding 32, reference symbol Ia represents a current flowing through the input winding 31, reference symbol Ib represents a current flowing through the output winding 32 and the first diode 71, and reference symbol Ic represents a current flowing through the output winding 32 and the second diode 72. In FIG. 2, reference symbol $i_M$ is an exciting current flowing through the transformer 3, and is one of currents Ia, Ib and Ic. Next, the case that input voltage Vi is lower than output voltage Vo is described as an example.

As shown in FIG. 3, the first switching element SW1 of the first energy transfer circuit is turned ON at time T1 and current Ia flows. As shown in FIG. 2, current $i_M$=Ia continues to rise for a period from time T1 to time T2. Thereby, the energy corresponding to current Ia is stored in the transformer 3. A voltage having the positive polarity at the black circular dot side is generated in the output winding 32.

At this time, no current flows through the first and second diodes 71 and 72. The reason is that the first and second diodes 71 and 72 are connected so as to be reverse in polarity to a voltage generated in the output winding 32.

Next, as shown in FIG. 4, at time T2 the first switching element SW1 is turned OFF and the second switching element SW2 is turned ON. When the first switching element SW1 is turned OFF, a flyback voltage V2 having the negative polarity at the black circular dot side is generated in the output winding 32 on the basis of the energy stored when the first switching element SW1 is ON.

And due to a fact that the first switching element SW1 is turned OFF and the second switching element SW2 is turned ON, a circuit loop of input terminal 11 first diode 71 output winding 32 output terminal 21 load R (not illustrated) output terminal 22 second switching element SW2 input terminal 12 is formed and current Ib flows through this circuit loop. As shown in FIG. 2, current $i_M$=Ib continues lowering during a period from time T2 to time TS.

The capacitor 8 is charged by a voltage obtained by adding the input voltage Vi and the flyback voltage V2 to each other. Assuming that the turn ratio of the transformer 3 is n3 and the ON duty of the first switching element SW1 is D3, the output voltage Vo appearing at output terminals 21 and 22 is as follows:

$$Vo=Vi+n3\cdot Vi\cdot D3/(1-D3)$$

Next, as shown in FIG. 5, when the second switching element SW2 is turned OFF at time TS, current comes not to flow through the first diode 71. Current Ic is made to flow through the second diode 72 by the energy stored in the transformer 3. As shown in FIG. 2, current $i_M$=Ic continues lowering during a period from time T2 to time TS. And after time TS, a similar operation to that from time T1 to T2 is performed and a cyclic operation results in continuing.

As described above, the power supply unit of the present invention includes a first energy transfer circuit. The first energy transfer circuit comprises a transformer 3 and a first switching element SW1, and the first switching element SW1 is connected in series with the input winding 31 of the transformer 3.

Thus, the first energy transfer circuit can transfer the energy stored in the transformer 3 while the first switching element SW1 is ON through the output winding 32 of the transformer 3 to the output terminals 21 and 22 during the subsequent OFF period, in a similar manner to a buck-boost type power supply unit of a flyback system or the like.

Therefore, since the power supply unit of the present invention can achieve an operation similar to a buck-boost type power supply unit of a flyback system or the like, a situation in which the input voltage Vi is output through the lines without regulation does not occur when the first switching element SW1 has stopped its switching operation and is in an OFF state. Furthermore, if the output terminals 21, 22 are short-circuited or overloaded, protection against overcurrent can be realized by a switching operation of the first switching element SW1. And since power is transferred through the transformer 3, there is not the possibility that a rush current runs to the smoothing capacitor 8 provided at the output terminals 21 and 22. In addition, since an output voltage Vo can be optionally set, it is not necessary to provide a DC-DC converter having a high allowable input voltage at a rear stage.

The power supply unit of the present invention includes a second energy transfer circuit. The second energy transfer circuit includes a second switching element SW2 and an output winding 32 of a transformer 3. The second switching element SW2 and the output winding 32 are inserted and connected within a circuit loop that runs from one of the input terminals to one of the output terminals and then runs to a load and the other of the output terminals before returning to the other of the input terminals.

Thus, the second energy transfer circuit constitutes a circuit for transferring energy from the input terminals to the output terminals via the output winding 32 while the second switching element SW2 is ON. That is to say, the second energy transfer circuit can transfer the energy supplied from the power supply to the output terminals 21 and 22 and can transfer the energy stored in the transformer 3 while the first switching element SW1 is ON to the output terminals 21 and 22 while the second switching element SW2 is ON.

Accordingly, in the power supply unit of the present invention, in case of transferring energy from the input terminals to the output terminals by means of the second energy transfer circuit, since it is not necessary to transfer the energy through an electromagnetic coupling between the input winding 31 and the output winding 32 of a transformer 3, a load on the transformer 3 is reduced and the efficiency of conversion is increased. And since the output winding 32 of the transformer 3 is used also as a choke coil, a dedicated choke coil is not necessary and reduction in number of components, miniaturization and reduction in cost can be achieved.

Moreover, in the power supply unit of the present invention, a first switching element SW1 included in a first energy transfer circuit and a second switching element SW2 included in a second energy transfer circuit are connected in parallel with each other being seen from the input terminal side. Due to this, even if the first and second switching elements SW1 and SW2 are turned ON at the same time, the electric current at the time of transferring energy is split and the power loss by the switching elements can be reduced.

In addition, the power supply unit of the present invention includes a voltage detector 51 and a control circuit 9. The voltage detector 51 detects the voltage between the output terminals 21 and 22, and generates a voltage detection signal. The control circuit uses the voltage detection signal and thereby controls, in at least one of the first and second switching elements SW1 and SW2, the length of time that the switching element remains ON and the timing with which the switching element is turned ON.

Thus, the power supply unit of the present invention can perform such controls as keeping an output voltage constant Vo, continuously transferring energy from the input side to the output side, improving the power factor.

Furthermore, the power supply unit of the present invention includes a current detector 52. In the embodiment illustrated, the current detector 52, which is connected to the input terminal 11, detects the current running through the transformer 3, based upon the current running through the input terminal 11, and thus generates a current detection signal.

That is to say, in the illustrated embodiment, the current detector 52 detects the currents Ia and Ib running through the transformer 3 since the current detector 52 is connected to the input terminal 11. And the current Ic is calculated based upon the values of the currents Ia and Ib since the current Ic corresponds to the energy that is stored in the transformer 3 by the currents Ia and Ib.

The control circuit 9 uses the current detection signal in addition to the voltage detection signal, and thereby detect the current $i_M$ running through the transformer 3. Thus, the control circuit 9 can control, in at least one of the first and second switching elements SW1 and SW2, the length of time that the switching element remains ON and the timing with which the switching element is turned ON, and the current $i_M$ running through the transformer 3 is controlled to flow in a continuous mode.

Since the transformer current $i_M$ is controlled to flow in a continuous mode, there is no possibility in that the transformer current might run at large value in a period in which the transformer current is not zero. The peak value of the transformer current does not rise.

Accordingly, large power supply (200 W or larger, for example) to the load is achieved without employing a large-sized transformer for large current flowing or a large-capacity switching element for large current switching.

And since it is unnecessary to employ a large-sized transformer for large current flowing or a large-capacity switching element for large current switching, problems such as cost increase and size increase in power supply units are prevented.

By the way, Prior Art 1 described above discloses a configuration suitable for improving the power factor, in which the control circuit receives a detected signal of the output voltage appearing between the output terminals and a detected signal of the current running to the first switching element, shifts the phase of the detected output voltage signal by approximately 90 degrees, compares the phase-shifted signal with the detected current signal and controls the first switching element based upon the compared output signal.

However, since the configuration disclosed in Prior Art 1 presupposes control in a current-discontinuous mode, it cannot perform control such that the current $i_M$ through the transformer 3 flows in a continuous mode.

A continuous mode control is described in detail with reference to the following simulation data.

First, modeling the power supply unit shown in FIG. 1, analysis is performed by means of simulation. In simulation, applying a state averaging method to an operation mode shown in FIG. 2 on the assumption that input current flowing through the input terminal 11 is $i_i$, output voltage between output terminals 21 and 22 is $v_o$, the resistance value of a load R is R, the capacitance value of a capacitor 8 is C, the inductance of a transformer 3 is $L_M$, the time ratios corresponding to the ON states of SW1 and SW2 are respectively $d_1$ and $d_2$, and an input voltage is $V_i$, the following expression is obtained:

$$\frac{d}{dt}\begin{bmatrix} v_o \\ i_i \end{bmatrix} = \begin{bmatrix} -\frac{1}{RC} & -\frac{n(1-d_1)}{C} \\ -\frac{n(1-d_1)}{L_M} & 0 \end{bmatrix}\begin{bmatrix} v_o \\ i_i \end{bmatrix} + \begin{bmatrix} 0 \\ \frac{d_1+nd_2}{L_M} \end{bmatrix}V_i \quad (9)$$

Finding a steady state from expression (9), the following value is obtained:

$$V_o = \left(\frac{d_1+nd_2}{n(1-d_1)}\right)V_i \quad (10)$$

Therefore, the operation mode shown in FIG. 2 can be confirmed to be a buck-boost operation.

Next, the basic configuration of a control system for the operation mode shown in FIG. 2 is examined.

Assuming "n=1" from the viewpoint of current continuity, from expression (9) the following expression is obtained:

$$\frac{di_i}{dt} = -\frac{1-d_1}{L_M}v_o + \frac{d_1+d_2}{L_M}v_i \quad (20)$$

Assuming that the phase of input voltage $V_i$ is ùt, since PFC is attained, expression (20) becomes the following expression:

$$\omega L_M I_i \cos\omega t = -(1-d_1)v_o + (d_1+d_2)v_i \sin\omega t \quad (21)$$

Due to "ù$L_M I_i$<<1", assuming the following condition:

$$d_1 = D_1 + \ddot{A}d, \, d_2 = D_2 + \ddot{A}d \text{ (}D_1 \text{ and } D_2 \text{ are constants)} \quad (22)$$

A state of equilibrium shown in the following expression is obtained:

$$0 = -(1-D_1)V_o + (D_1+D_2)V_i \sin\omega_t \quad (23)$$

In short, a current control is performed by means of Äd. Transforming expression (23), the following expression is obtained:

$$1 = \left(1 + \frac{V_i}{V_o}\sin\omega t\right)D_1 + \left(\frac{V_i}{V_o}\sin\omega t\right)D_2 \quad (24)$$

It comes to be enough to find $D_1$ and $D_2$ meeting expression (24). Hereupon, assuming the following expression:

$$D_1 = 1 - D\sin\omega t, D_2 = D\sin\omega t \quad (25),$$

it comes to be enough to set the following expression:

$$D = V_i/V_o \quad (26)$$

Figure 6:
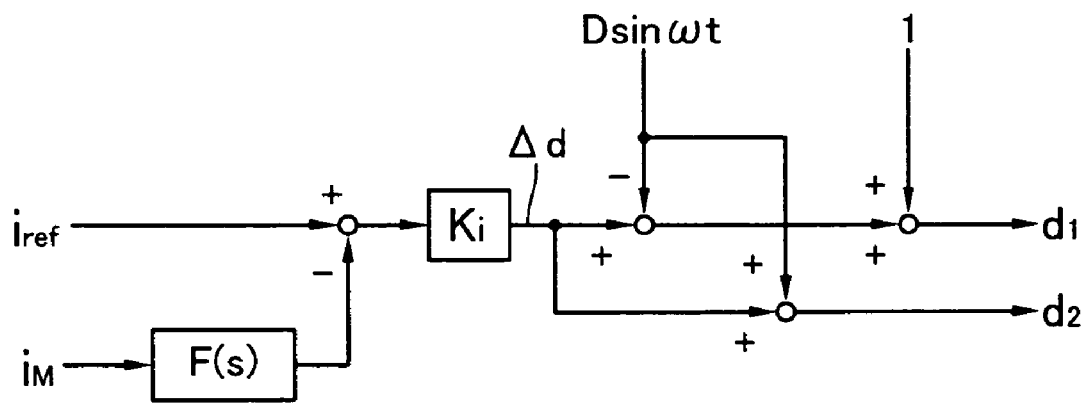
FIG. 6 is a block diagram showing a control system.

Therefore, assuming that current $i_M$ is a current flowing through the transformer 3, F(s) is a filter and $K_i$ is a proportional gain, a block diagram of a control system can be designed as shown in FIG. 6. Representing FIG. 6 with an electric circuit, FIG. 7 is obtained.

Figure 7:
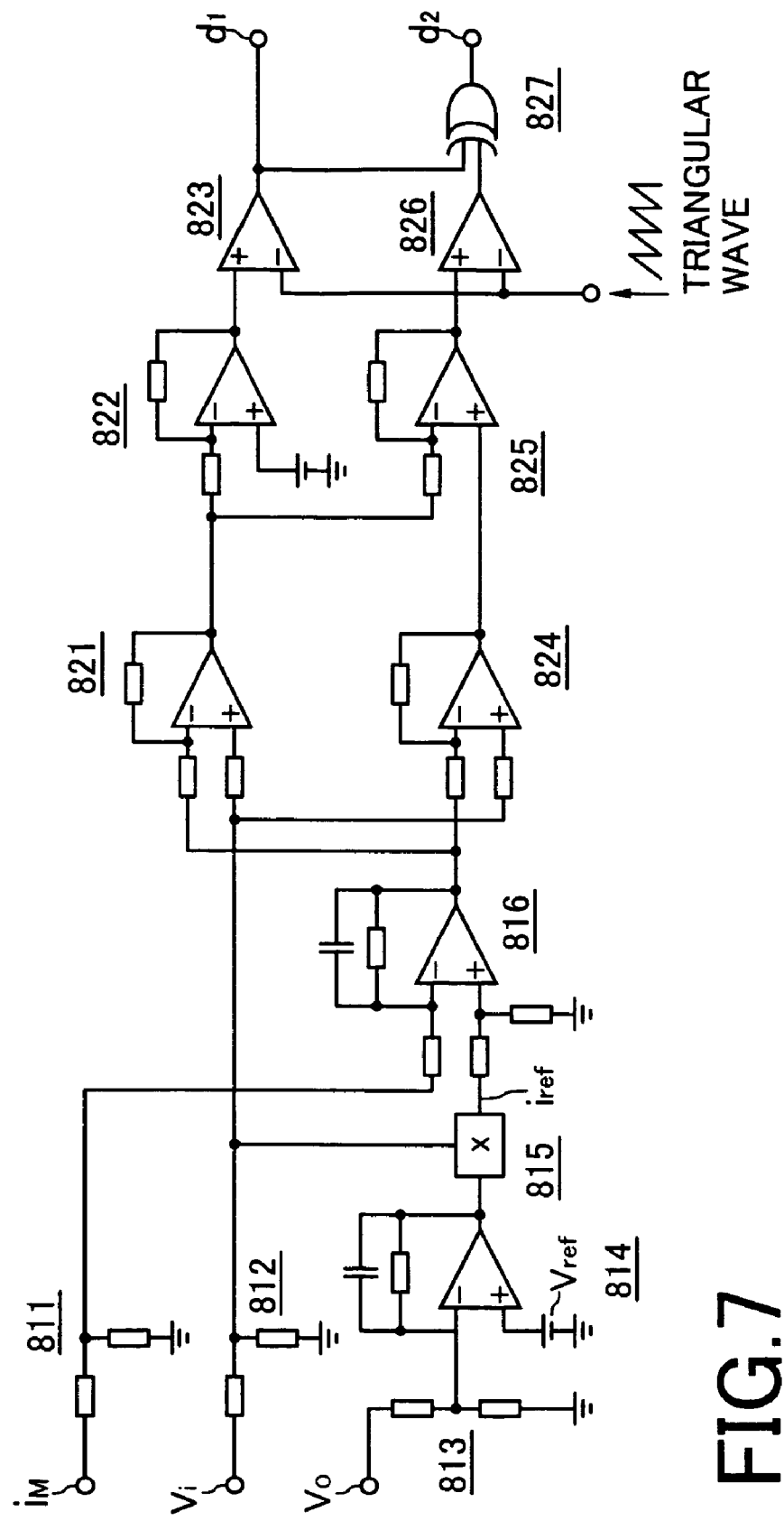
FIG. 7 is a diagram representing the block diagram shown in FIG. 6 by means of an electric circuit.

In FIG. 7, circuit unit 811 processes and outputs current $i_M$ to circuit unit 816. Circuit unit 812 processes and outputs input voltage $V_i$ to circuit units 815, 821 and 824. Circuit unit 813 processes and outputs output voltage $v_o$ to circuit unit 814.

The circuit unit 814 is a compensator and has a function of stabilizing the control system. The circuit unit 815 generates a target value of current ($i_{ref}$) by means of an input signal. The circuit unit 816 takes the difference between an input signal and the target value of current ($i_{ref}$) using the input signal.

The circuit units 821 and 824 each are an adder. Circuit unit 822 generates a signal wave using a signal output from the circuit unit 821 and a specified reference value. The circuit unit 825 generates a signal wave using a signal output from the circuit unit 821 and a signal output from the circuit unit 824.

The circuit units 823 and 826 each are a comparator. The circuit unit 823 compares a signal output from the circuit unit 822 with a specified triangular wave and generates a PWM pulse (time ratio d, corresponding to an ON state of SW1). The circuit unit 826 compares a signal output from the circuit unit 825 with a triangular wave. Circuit unit 827 calculates the logical XOR (exclusive OR) of a signal output the circuit unit 823 and a signal output from the circuit unit 826 and generates a PWM pulse (time ratio $d_2$ corresponding to an ON state of SW2).

Figure 8:
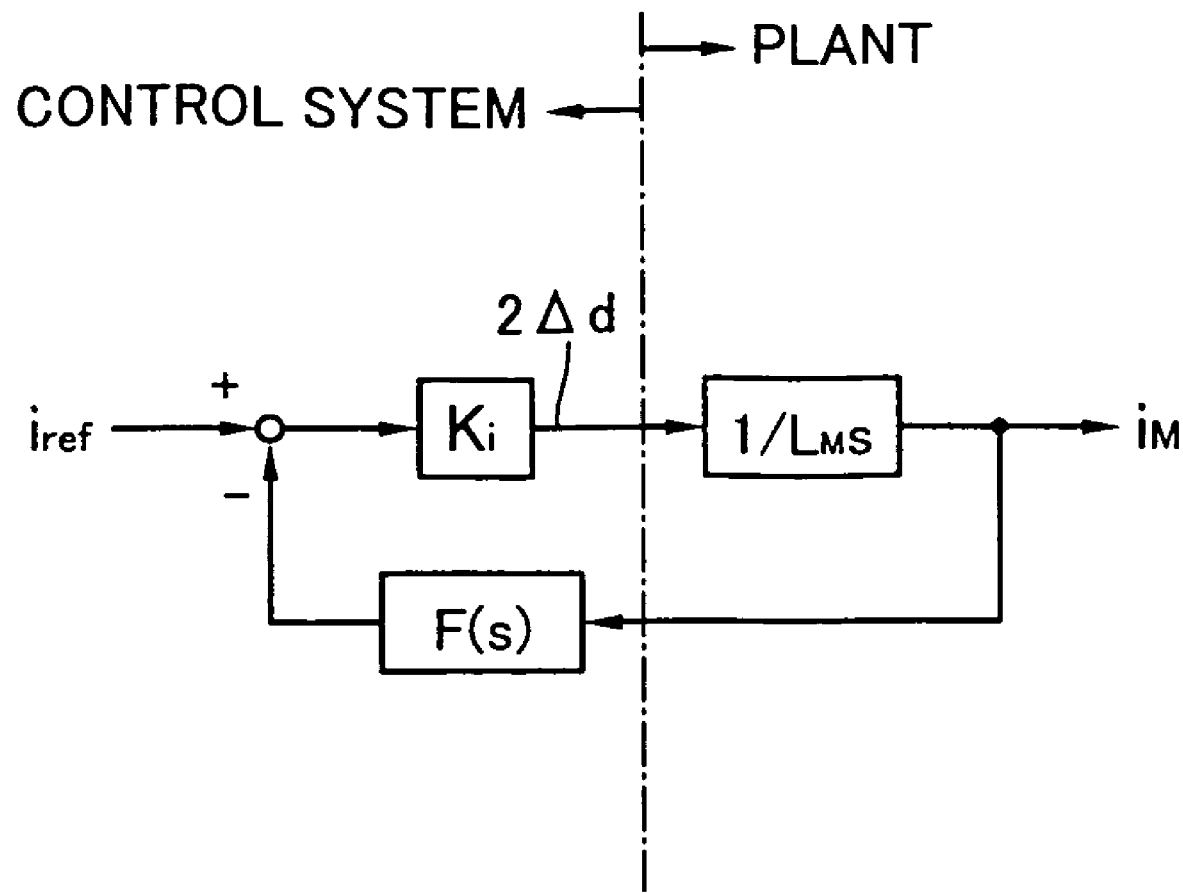
FIG. 8 is a block diagram of a closed loop.

Since a state of equilibrium meeting expression (23) has been taken, a block diagram of the closed loop becomes FIG. 8.

From FIG. 8, a closed loop transfer function $G_i(s)$ is obtained as the following expression:

$$i_M = \frac{2K_i}{L_M s\{1 + 2K_i F(s)/L_M s\}} i_M \quad (27)$$

Hereupon, assuming that F(s) is a primary low-pass filter, expression (27) becomes a secondary delay system, which is a stable control system. Therefore, the following expression is obtained:

$$i_M = \frac{1}{1 + 2\delta_i(s/\omega_{ni}) + (s/\omega_{ni})^2} i_M \quad (28)$$

Here, the following expression is presupposed:

$$\omega_{ni} = \sqrt{\frac{2K_i \omega_i}{L_M}} i_M, \delta_i = \frac{1}{2}\sqrt{\frac{L_M \omega_i}{2K_i}} \quad (29)$$

Hereupon, ù$_i$ is the cut-frequency of F(s). Since the electric current varies dynamically and has a waveform taking zero, preferably vibration is made as less as possible. Accordingly, ä$_i$=0.7 is taken. At this time, $K_i$ is represented by the following expression:

$$K_i \approx L_M \omega_i/4 \quad (30)$$

And although ù$_i$ is determined in consideration of the ratio of ripple removal of current $i_M$, it is preferably determined as about ¹⁄₁₀₀ of a switching frequency, for example.

And a full-wave rectification is performed by a diode bridge 111, input voltage $V_i$ and input current $i_i$ are preferably zero in phase. Finding a phase difference φ in commercial frequencies ù$_{cs}$, the following expression is obtained:

$$\phi = -\tan^{-1}\left(\frac{2\delta_i \omega_{cs} \omega_{ni}}{\omega_{ni}^2 - \omega_{cs}^2}\right) \quad (31)$$

Next, verification by simulation was performed in order to verify the propriety of analysis result. The specifications of simulation design were as follows:

| | |
|---|---|
| Input voltage Ei: | 100/200 V AC, 50 Hz in frequency |
| Voltage Vi between input terminals 11 and 12: | Full-wave rectified 100/200 VAC |
| Output voltage Vo: | 240 V DC |
| Output capacity: | 100 W/500 W |
| Electrostatic capacitance of the smoothing capacitor 8: | 1,600 μF |
| Exciting inductance of the transformer 3: | 100 μH |
| Switching frequency of SW1 and SW2: | 200 kHz |

Assuming that the cut-off frequency of the filter is 2 kHz, from expressions (30) and (31) the following values are obtained:

$K_i$=0.31

φ=−2.8

Figure 9A:
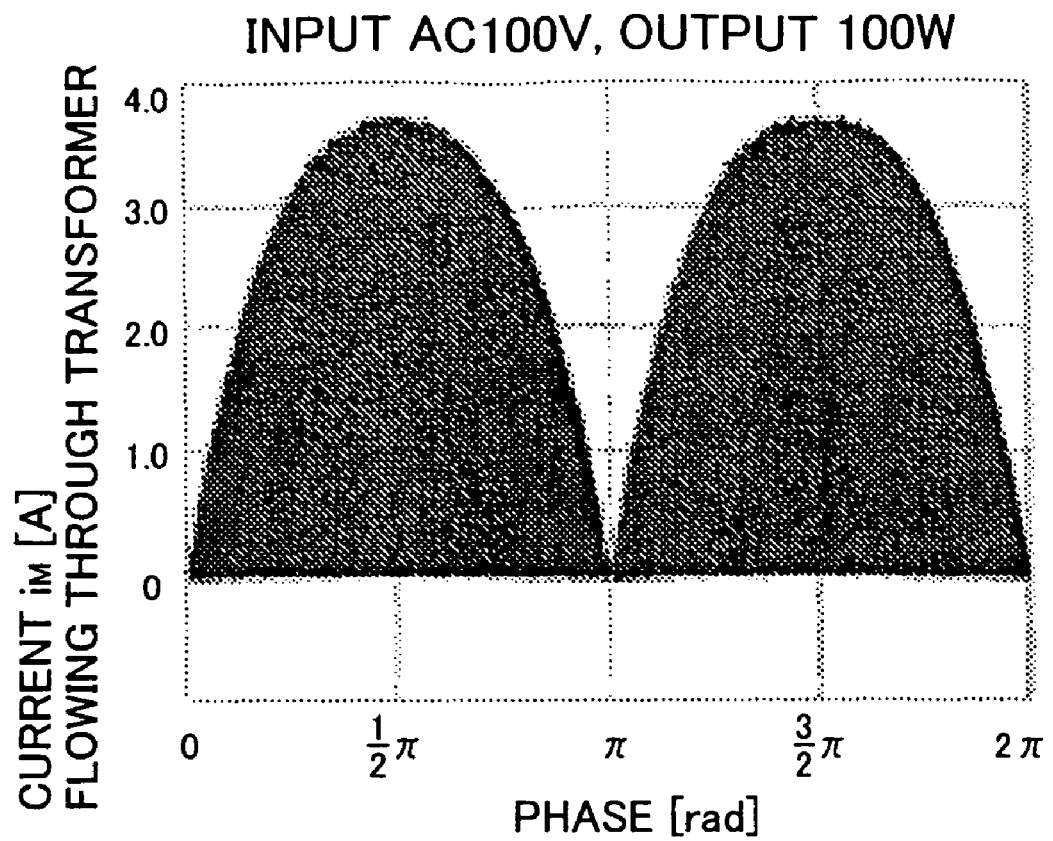
FIG. 9 is a waveform diagram of current $i_M$ flowing through a transformer 3.
Figure 9B:
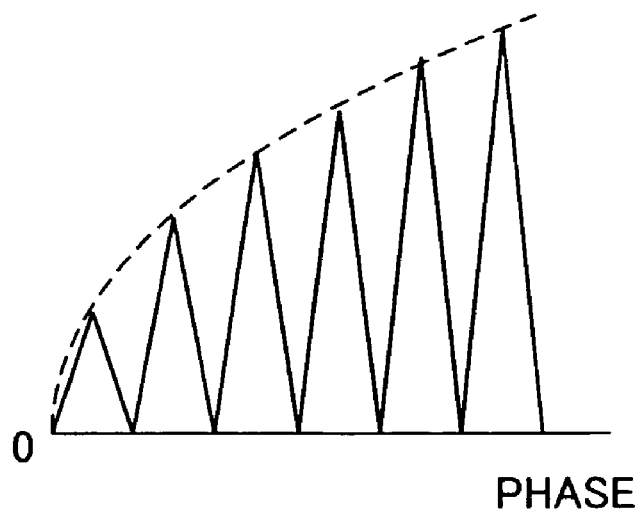

The waveform of current $i_M$ flowing through the transformer 3 was obtained by performing simulation under this condition. FIG. 9a shows the waveform when input voltage is 100V AC and output power is 100 W. FIG. 9b is a partial, schematic diagram in which the waveform in FIG. 9a is stretched out along the axis of abscissas. In the condition of simulation, the switching frequency (200 kHz) of SW1 and SW2 is set much higher in comparison with the frequency (50 Hz) of input voltage and so, in FIG. 9a, the current lines overlap one another and are shown as a black area. Other waveforms to be shown after this are also shown in the same way.

Figure 10:
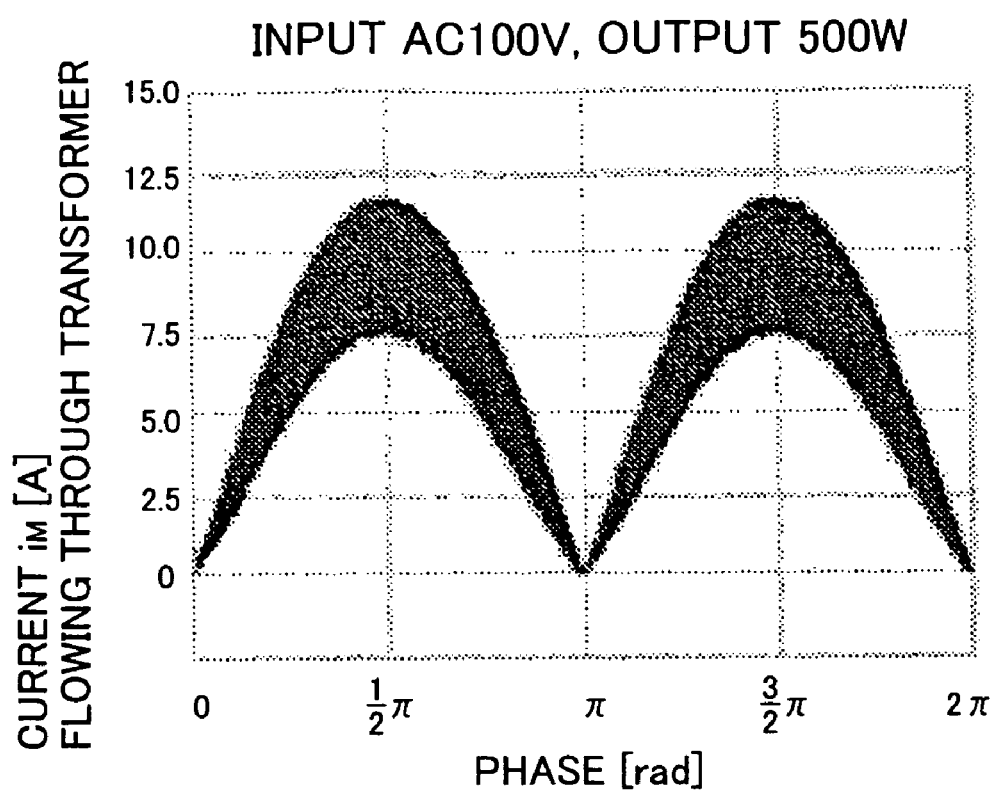
FIG. 10 is another waveform diagram of current $i_M$ flowing through the transformer 3.
Figure 11:
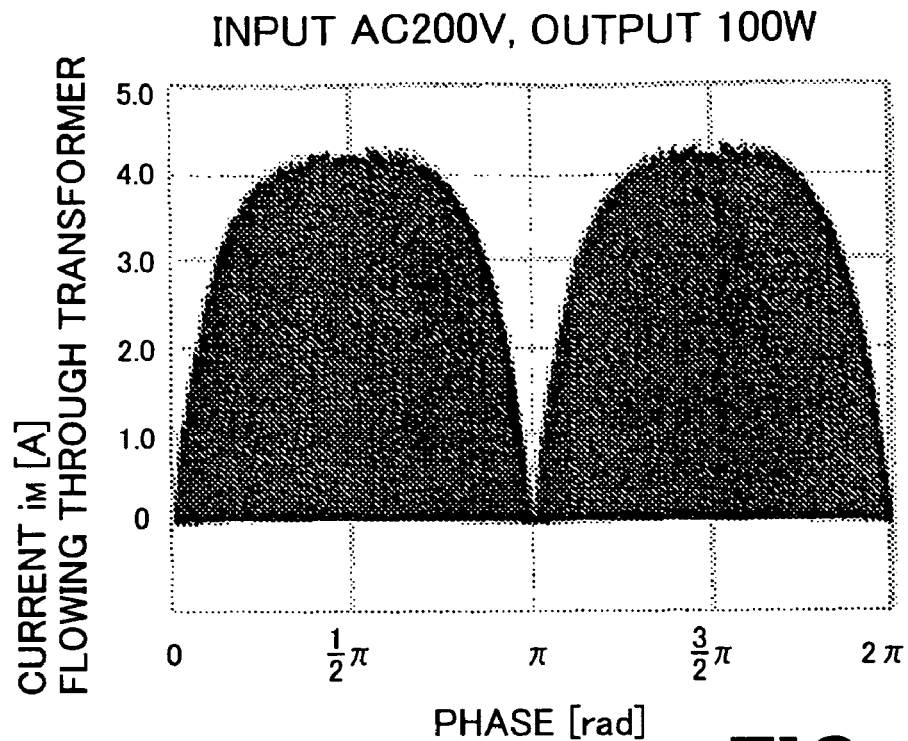
FIG. 11 is still another waveform diagram of current $i_M$ flowing through the transformer 3.
Figure 12:
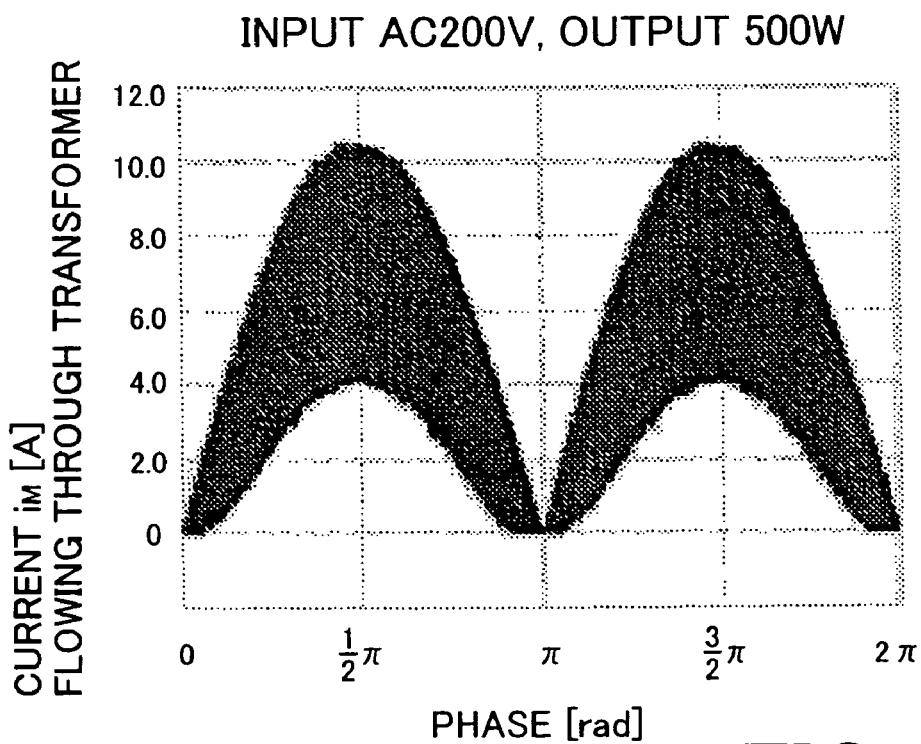
FIG. 12 is yet another waveform diagram of current $i_M$ flowing through the transformer 3.

Similarly, FIG. 10 shows the waveform when input voltage is 100V AC and output power is 500 W, FIG. 11 shows the waveform when input voltage is 200V AC and output power is 100 W, and FIG. 12 shows the waveform when input voltage is 200V AC and output power is 500 W. Output power 100 W is in a state of normal load, and output power 500 W is in a state of heavy load.

In each waveform diagram shown in FIGS. 9 to 12, a period in which the current value continues to be zero is not found. Therefore, it is understood that the current $i_M$ through the transformer 3 is controlled to flow in a continuous mode regardless of input voltage and output power.

Further, since a full-wave rectified waveform of sine wave is obtained and the current of the input terminals (current $i_M$ flowing through the transformer 3) coincides in phase with the voltage between the input terminals 11 and 12, it is known that the improvement in power factor can be realized.

In FIG. 11, peak values are made somewhat larger in the vicinities of phases π/4, 3π/4, 5π/4 and 7π/4 (rad) but these peak values are so small that they do not come into question in practice.

As understood from the above, by controlling the time ratio $d_1$ and the time ratio $d_2$ by means of the voltage detection signal and the current detection signal, it is possible to perform a PFC operation such that the current $i_M$ through the transformer 3 flows in a continuous mode, and thus achieve large-capacity output power.

Figure 13:
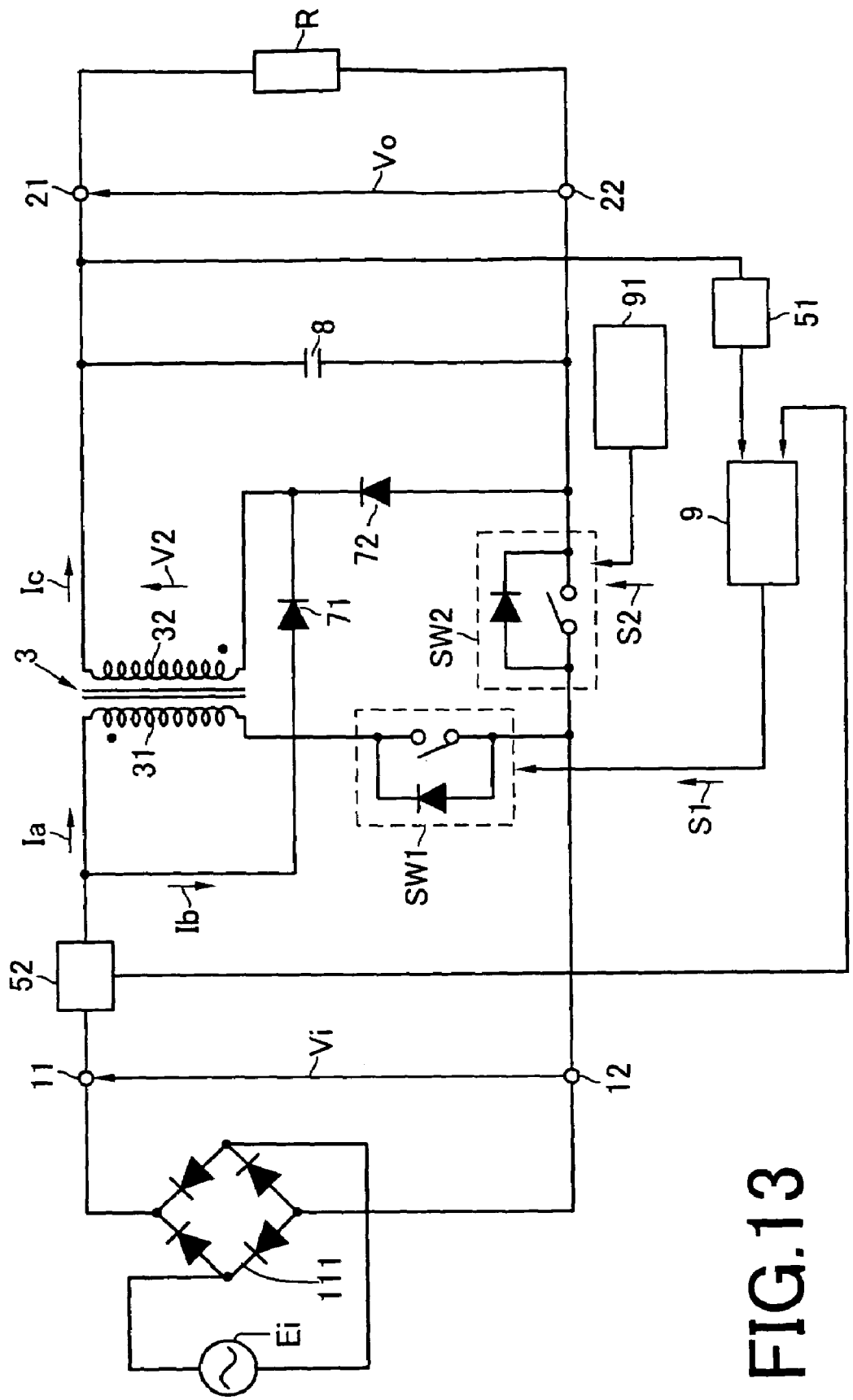
FIG. 13 is an electric circuit diagram showing another embodiment of a power supply unit according to the present invention.

FIG. 13 is an electric circuit diagram showing another embodiment of a power supply unit according to the present invention. In this figure, the same components as those of FIGS. 1 to 3 are given the same reference symbols and the duplicated description is omitted.

A power supply unit illustrated includes a control circuit 9 and a time constant circuit 91. In the illustrated embodiment, the control circuit 9 is composed of a single general-purpose PFC control IC. The time constant circuit 91 is composed of inexpensive passive components such as a resistor, a capacitor and the like rather than an expensive IC.

The control circuit 9 generates and feeds a first control signal S1 to a first switching element SW1 and controls, only in the first switching element SW1, the length of time when the switching element is ON and the timing with which the switching element is turned ON so that current $i_M$ flowing through a transformer 3 flows in a continuous mode.

The auxiliary circuit 91 is supplied with the first control signal S1, generates a second control signal S2 on the basis of the first control signal S1, supplies the second control signal S2 to the second switching element SW2, controls, in the second switching element SW2, controls the length of time when the switching element is ON and the timing with which the switching element is turned ON. The auxiliary circuit 91 can be formed into such a configuration that the trailing edge of the first control signal S1 is used as a trigger and after a specified time has elapsed from the trigger, the second control signal S2 rises up. From the viewpoint of reducing the time constant circuit 91 in cost, it is preferable that the second control signal S2 is a fixed time ratio signal, for example.

Next, a power supply unit shown in FIG. 2 is modeled and analyzed by simulation. In the simulation, the same components as the components described above are given the same reference symbols and the duplicated description is omitted.

As a fixed value of the time ratio $d_2$ of the second switching element SW2, the average of expression (25) can be used. That is to say, the following value can be used:

$$d_2 = \frac{2}{\pi} D \qquad (32)$$

Figure 14:
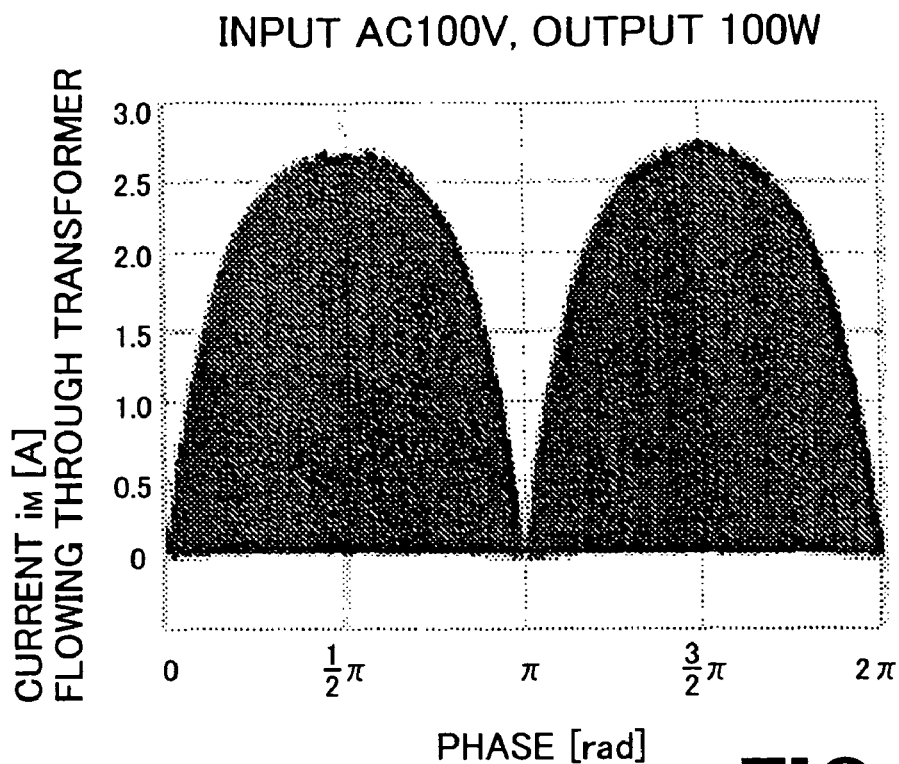
FIG. 14 is further another waveform diagram of current $i_M$ flowing through the transformer 3.
Figure 15:
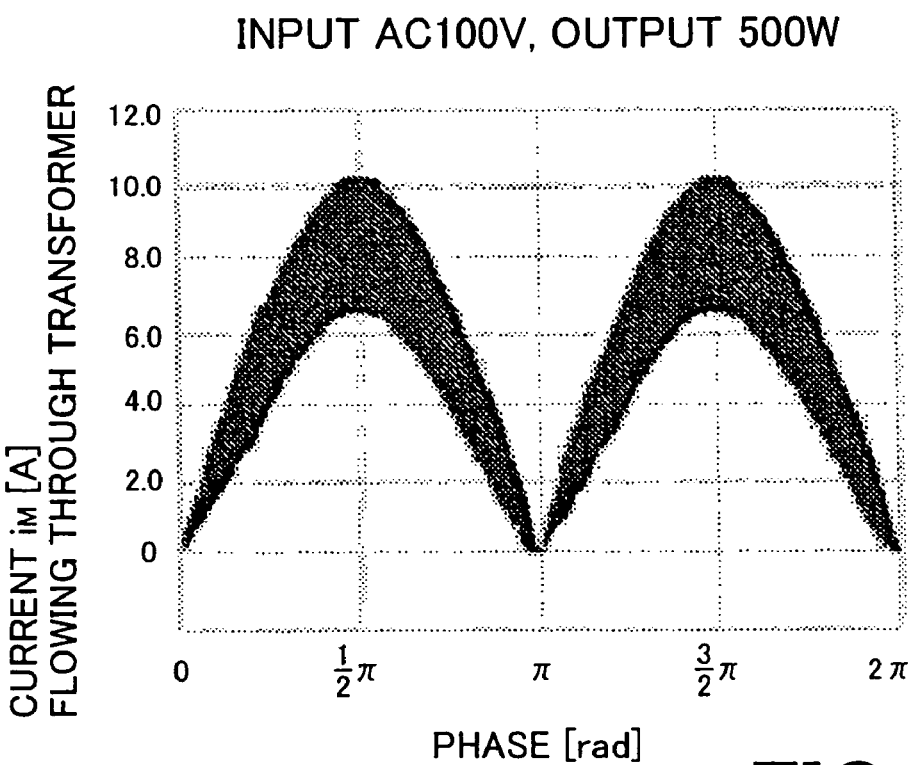
FIG. 15 is further another waveform diagram of current $i_M$ flowing through the transformer 3.
Figure 16:
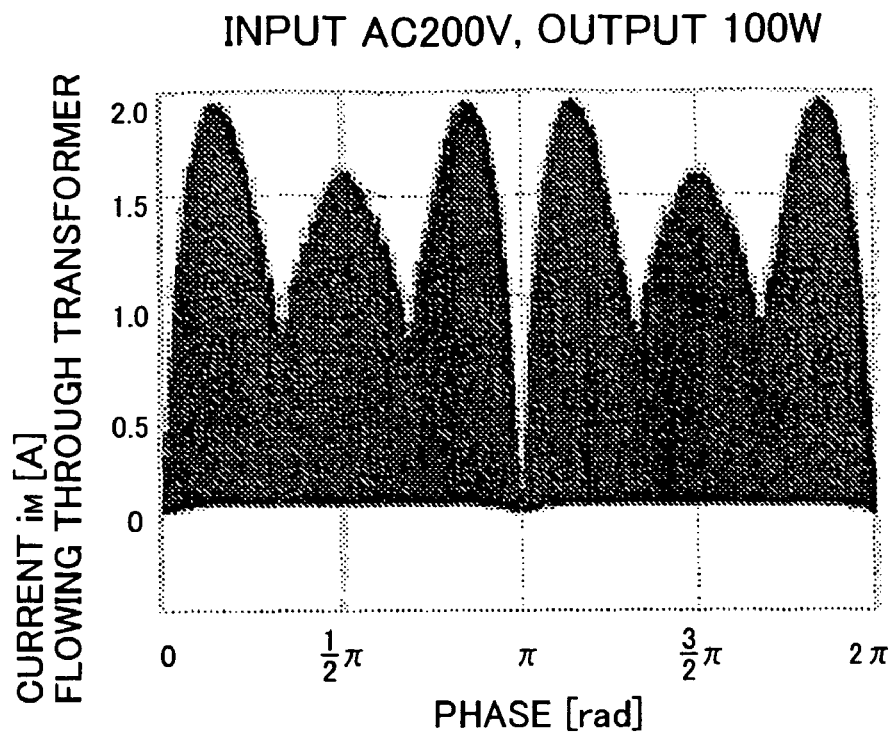
FIG. 16 is further another waveform diagram of current $i_M$ flowing through the transformer 3.
Figure 17:
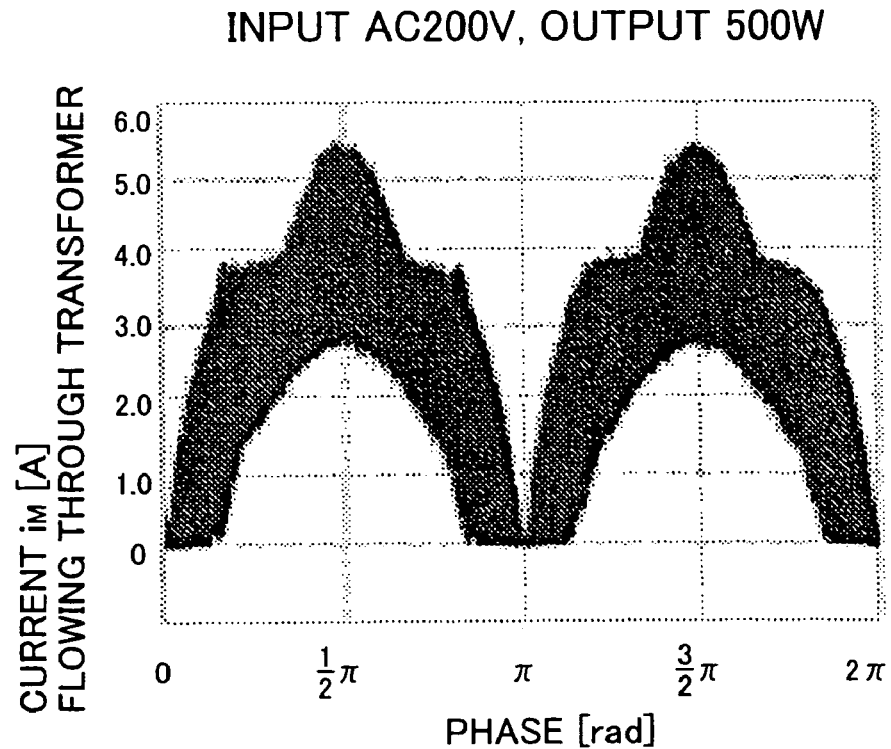
FIG. 17 is further another waveform diagram of current $i_M$ flowing through the transformer 3.

The waveform of current $i_M$ flowing through the transformer 3 was obtained by performing simulation using proportional gain $K_i=0.375$ in case of input voltage 100V AC and proportional gain $K_i=0.75$ in case of input voltage 200V AC. FIG. 14 shows the waveform when input voltage is 100V AC and output power is 100 W, FIG. 15 shows the waveform when input voltage is 100V AC and output power is 500 W, FIG. 16 shows the waveform when input voltage is 200V AC and output power is 100 W, and FIG. 17 shows the waveform when input voltage is 200V AC and output power is 500 W. Output power 100 W is in a state of normal load, and output power 500 W is in a state of heavy load.

In each waveform diagram shown in FIGS. 14 to 17, a period in which the current value continues to be zero is not found. Therefore, it is understood that the current $i_M$ through the transformer 3 is controlled to flow in a continuous mode regardless of input voltage and output power.

Further, in input voltage 100V AC, it has been confirmed that the waveform hardly varies and a good characteristic is obtained even if the time ratio $d_2$ is fixed. And in case fixing the time ratio $d_2$, it has been confirmed that the peak value of current $i_M$ is lowered.

And in input voltage 200V AC, it has been confirmed that by fixing the time ratio $d_2$ the waveform comes to be somewhat out of order but the disorder of waveform is so small that it does not come into question in practice. The reason why the waveform comes to be out of order in input voltage 200V AC is thought to be that the case of input voltage 200V AC has a larger range in which time ratio $d_2$ is varied as seen from expression (25).

As understood from the above, by controlling only the time ratio $d_1$ by means of the voltage detection signal and the current detection signal, it is possible to perform a PFC operation such that the current through the transformer flows in a continuous mode, and thus achieve large-capacity output power.

And since the illustrated embodiment uses a single general-purpose PFC control IC and a single time constant circuit, it can be made lower in cost in comparison with the case of using a control circuit composed of two general-purpose PFC control ICs shown in FIG. 1 or a control circuit composed of a general-purpose PFC control circuit and a counter circuit.

And since the illustrated embodiment uses a single general-purpose PFC control IC and a single time constant circuit, it can be easily changed in design on the basis of a circuit configuration using a control IC for converter and a single time constant circuit which are used extensively at present.

Next, a configuration capable of keeping the time ratio $d_2$ constant without relying on the input voltage is examined.

Since the case of input voltage of 100V AC provided a better characteristic in case of comparing the waveform in FIGS. 14 and 15 (input voltage of 100V AC) with the waveform in FIGS. 16 and 17 (input voltage of 200V AC), the proportional gain $K_i=0.375$ was used.

Figure 18:
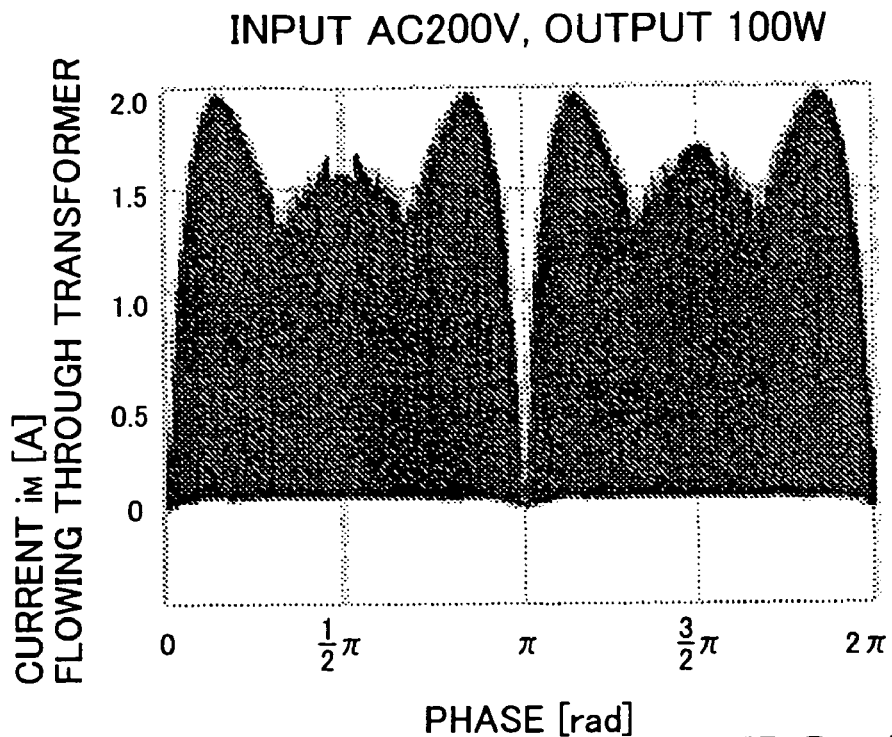
FIG. 18 is further another waveform diagram of current $i_M$ flowing through the transformer 3.

The waveform of current $i_M$ flowing through a transformer 3 was obtained by performing simulation under this condition. FIG. 18 shows the waveform when input voltage is 200V AC and output power is 100 W, and FIG. 19 shows the waveform when input voltage is 200V AC and output power is 500 W.

Figure 19:
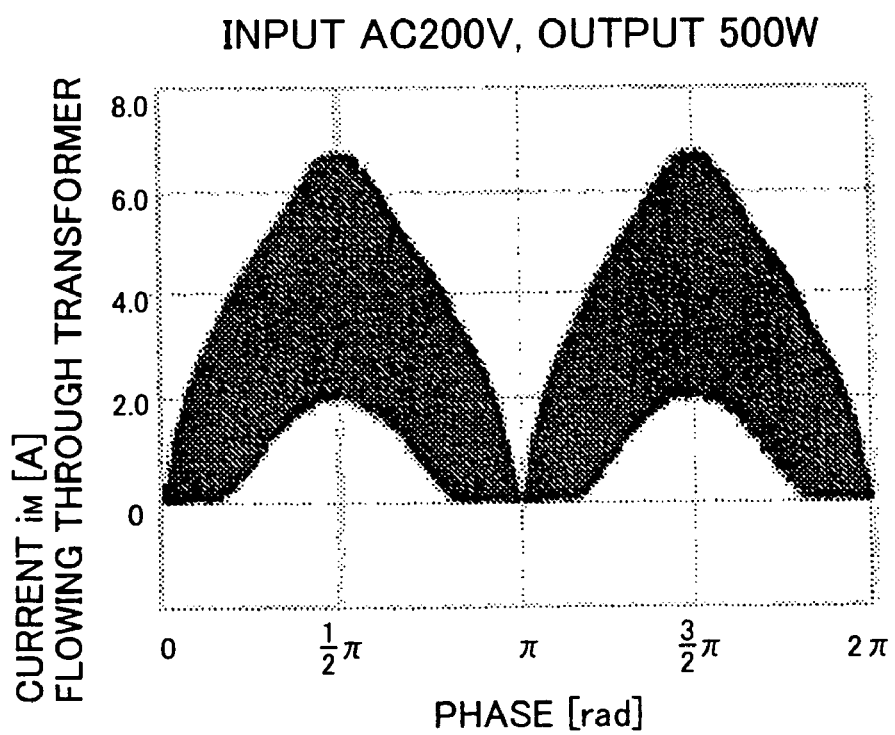
FIG. 19 is further another waveform diagram of current $i_M$ flowing through the transformer 3.

Comparing the waveforms of FIGS. 18 and 19 with the waveforms of FIGS. 16 and 17, it was confirmed that although a ripple component was somewhat increased the waveform was improved and that the disorder of waveform was so small that it did not come into question in practice.

Although the case that input voltage Vi is lower than output voltage Vo has been described as an example in the above-mentioned embodiments, it is self-evident that those who are in this technical field can adopt variations of the embodiments on the basis of basic technical ideas and teachings of the present invention in case that input voltage Vi is equal to a target output voltage Vo and in case that input voltage Vi is higher than a target output voltage Vo. And it is self-evident also to be capable of providing an excellent action and effect similar to the above-mentioned embodiments in case of adopting these variations.

Figure 20:
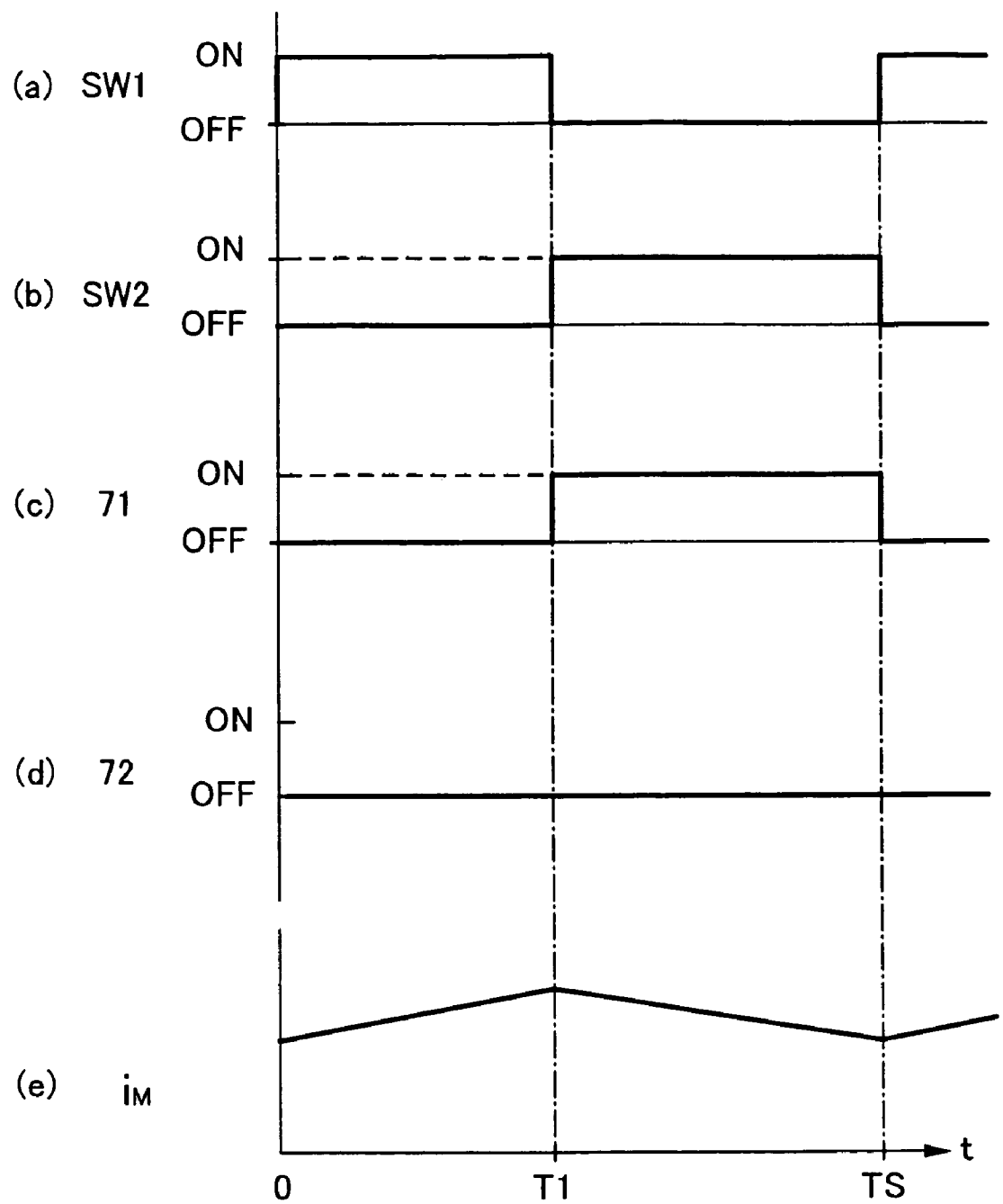
FIG. 20 is a timing chart showing another embodiment of a power supply unit according to the present invention.

Furthermore, although detailed description is omitted, it is possible to realize, for example, a mode as shown in FIG. 20 by performing control so that a transformer current can flow in a continuous mode using a voltage detection signal and a current detection signal and to provide an excellent action and effect of the present invention as described above.

And in the present invention, there may be a period in which a transformer current is zero in a light load state. The reason is that since only a very small current can flow through a transformer and the like in a light load state, a problem that the peak value of current flowing through the transformer and the like rises up does not occur.

Although the contents of the present invention have been concretely described above with reference to the preferred embodiments, it is self-evident that those who are in this technical field can adopt various variations of the embodiments on the basis of basic technical ideas and teachings of the present invention.

What is claimed is:

1. A power supply unit comprising input terminals, output terminals, a first energy transfer circuit, a second energy transfer circuit, a voltage detector, a current detector and a control circuit, wherein:

said input terminals are the terminals to which a voltage obtained by full-wave rectifying an AC voltage is input;

said first energy transfer circuit includes a transformer, a first switching element, a second diode and a capacitor;
said first switching element is connected in series to an input winding of said transformer;
said second diode is connected in series with an output winding of said transformer while having directionality that runs in the forward direction relative to the voltage generated at said output winding when said first switching element is OFF and the circuit thus connected in series is connected to said output terminals;
said capacitor is connected between said output terminals;
said first energy transfer circuit constitutes a circuit for transferring the energy that stores in said transformer while said first switching element is ON, to said output terminals via said output winding of said transformer during a subsequent OFF period;
said second energy transfer circuit includes a second switching element, said output winding of said transformer and a first diode;
said second switching element, said output winding and said first diode are connected within a circuit loop that runs from one of said input terminals to one of said output terminals and then runs to a load and the other of said output terminals before returning to the other of said input terminals;
one end of said first diode is connected with one end of said second diode while having the same polarity;
said second energy transfer circuit constitutes a circuit for transferring energy from said input terminals to said output terminals via said output winding while said second switching element is ON;
said voltage detector generates a voltage detection signal by detecting a voltage that appears at said output terminals;
said current detector generates a current detection signal by detecting a transformer current that runs through said transformer; and
said control circuit uses said voltage detection signal and said current detection signal and thereby controls said first and second switching elements to satisfy the following relationship such that the transformer current flows in a continuous mode:

$$\frac{di_i}{dt} = -\frac{1-d_1}{L_M}v_o + \frac{d_1+d_2}{L_M}v_i \tag{20}$$

where $v_i$ is an input voltage applied to said input terminals, $i_1$ is an input current flowing through said input terminal, $v_o$ is an output voltage output from said output terminals, $L_M$ is an inductance of said transformer, and $d_1$ and $d_2$ are time ratios corresponding to the ON states of said first and second switching elements, respectively.

2. The power supply unit of claim 1, wherein:
said current detector detects the transformer current based upon a current passing through said input terminals.

3. The power supply unit of claim 1, wherein:
said control circuit controls said first and second switching elements such that the transformer current flows in a continuous mode, under normal-load conditions or heavy-load conditions.

4. The power supply unit of claim 1, wherein:
said control circuit controls the second switching element to satisfy the following relationship:

$$d_2 = \frac{2}{\pi}D \tag{32}$$

(where $D=V_i/V_o$).

5. A power supply unit comprising:
input terminals to which a voltage obtained by full-wave rectifying an AC voltage is input;
output terminals;
a capacitor connected between the output terminals;
a transformer including an input winding and an output winding;
a first switching element connected in series to the input winding of the transformer;
a second diode connected in series to the output winding of the transformer so that the second diode and the output winding are connected to the output terminals, the second diode having directionality that runs in the forward direction relative to a voltage generated at the output winding when the first switching element is OFF, one end of the first diode connected to one end of the second diode while having a same polarity;
a second switching element so as to constitute a circuit loop together with the output winding, the first diode, the input terminals and the output terminals;
a voltage detector configured to generate a voltage detection signal by detecting a voltage at the output terminals;
a current detector configured to generate a current detection signal by detecting a transformer current running through the transformer; and
a control circuit configured to control the first and second switching elements based on the voltage detection signal and the current detection signal to satisfy the following relationship:

$$\frac{di_i}{dt} = -\frac{1-d_1}{L_M}v_o + \frac{d_1+d_2}{L_M}v_i \tag{20}$$

where $v_i$ is an input voltage applied to said input terminals, $i_i$ is an input current flowing through said input terminal, $v_o$ is an output voltage output from said output terminals, $L_M$ is an inductance of said transformer, and $d_1$ and $d_2$ are time ratios corresponding to the ON states of said first and second switching elements, respectively.

6. The power supply according to claim 5, wherein the current detector is configured to detect the transformer current based on a current passing through the input terminals.

7. The power supply unit according to claim 5, wherein the control circuit is configured to control the first and second switching elements such that the transformer current flows in a continuous mode under normal-load conditions or heavy-load conditions.

8. The power supply unit according to claim 5, wherein the control circuit is configured to control the second switching element to satisfy the following relationship:

$$d_2 = \frac{2}{\pi}D \text{ (where } D = V_i/V_o\text{).}$$

* * * * *